("12") United States Patent  
Tan et al.

(10) Patent No.: US 7,617,036 B2  
(45) Date of Patent: Nov. 10, 2009

(54) METHOD AND SYSTEM FOR DETERMINING THE VELOCITY OF AN AUTOMOBILE

(75) Inventors: Hualin Tan, Novi, MI (US); Edmund S. Browalski, West Bloomfield, MI (US); Ronald Paul, Detroit, MI (US); Christopher A. Kinser, Grand Blanc, MI (US); Stephen R. Pastor, Farmington Hills, MI (US); Michael P. Turski, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 493 days.

(21) Appl. No.: 11/533,469

(22) Filed: Sep. 20, 2006

(65) Prior Publication Data

US 2008/0071452 A1 Mar. 20, 2008

(51) Int. Cl.  
*G06F 19/00* (2006.01)

(52) U.S. Cl. .................. 701/70; 701/80; 702/142; 702/145; 73/146

(58) Field of Classification Search ........... 701/70, 701/80; 702/143, 33, 145; 73/146; *G06F 19/00*  
See application file for complete search history.

(56) References Cited

U.S. PATENT DOCUMENTS

| 5,406,486 | A | * | 4/1995 | Kamio et al. ............ 701/84 |
| 5,913,576 | A | * | 6/1999 | Naito et al. ............ 303/112 |
| 6,163,747 | A | * | 12/2000 | Matsuno ............ 701/80 |
| 6,217,134 | B1 | * | 4/2001 | Kato et al. ............ 303/158 |
| 6,353,384 | B1 | * | 3/2002 | Kramer ............ 340/438 |
| 6,692,089 | B2 | * | 2/2004 | Kuwajima et al. ............ 303/163 |
| 6,871,530 | B2 | * | 3/2005 | Sugai et al. ............ 73/146 |
| 7,203,579 | B2 | * | 4/2007 | Yokota et al. ............ 701/29 |
| 2003/0192375 | A1 | * | 10/2003 | Sugai et al. ............ 73/146 |
| 2004/0138831 | A1 | * | 7/2004 | Watanabe et al. ............ 702/33 |
| 2005/0029862 | A1 | * | 2/2005 | Kato et al. ............ 303/146 |
| 2005/0038589 | A1 | * | 2/2005 | Shukla ............ 701/80 |
| 2005/0044944 | A1 | * | 3/2005 | Kogure et al. ............ 73/146 |
| 2006/0259225 | A1 | * | 11/2006 | Ono et al. ............ 701/82 |

FOREIGN PATENT DOCUMENTS

JP 2001033472 A * 2/2001

* cited by examiner

*Primary Examiner*—Tuan C To

(57) ABSTRACT

A method and system, according to one embodiment of the present invention, provide a means to accurately determine the velocity of a vehicle. An initial estimation of the velocity of the vehicle is calculated based on rates of rotation of a plurality of wheels on the vehicles. If any of the wheels on the vehicle are in a brake control, or traction control, situation, the initial estimation is modified based on an acceleration of the vehicle to generate a modified estimation of the velocity of the vehicle.

8 Claims, 3 Drawing Sheets

METHOD AND SYSTEM FOR DETERMINING THE VELOCITY OF AN AUTOMOBILE

TECHNICAL FIELD

The present invention generally relates to automobiles, and more particularly relates to a method and system for determining the velocity of an automobile.

BACKGROUND OF INVENTION

In recent years, advances in technology, as well as ever evolving tastes in style, have led to substantial changes in the techniques used to design and build automobiles. One of the changes involves the complexity of the various electrical systems within automobiles.

Modern automobiles often employ dozens of electrical systems for monitoring and controlling virtually every aspect of operation. One of the electrical systems that is becoming increasingly common in automobiles of all types is known as Electronic Stability Control (ESC). ESC systems improve the handling of automobiles by selectively adjusting the activity of wheels to reduce vehicle understeer and oversteer tendencies. ESC systems often utilize anti-lock braking systems (ABS) and traction control systems (TCS), which are designed to prevent the wheels from slipping, or "spinning," by reducing the braking force and power to the wheels, respectively.

In order for ESC systems to operate effectively, an accurate estimation of the reference velocity (i.e., the speed of the automobile relative to the driving surface) is required, even during control actions such ESC, ABS, and/or TCS. In order to calculate speed, automobiles typically use wheel speed sensors, and in recent years, acceleration sensors (e.g., accelerometers) have also been utilized. Wheel speed sensors are known for being quite accurate. However, wheel speed sensors are used to calculate vehicle speed by simply detecting the rate of rotation of each wheel, without taking into effect the rotation of the wheel relative to the driving surface. As a result, wheel speed sensors may indicate a high vehicle speed and/or acceleration, when in fact the wheels are losing traction with the driving surface and thus spinning. Acceleration sensors, on the other hand, are considered to be reliable as they provide an absolute measure of the acceleration of the automobile regardless of the traction that the wheels have on the driving surface. However, acceleration sensors are known to provide "noisy" electrical signals and are often corrupted by gravitational forces, which adversely affect the accuracy of any speed calculation.

Accurately estimating reference velocity is particularly difficult in four-wheel drive (4WD) and all-wheel drive (AWD) vehicles because, for example, power is provided to all of the wheels on the vehicle. As a result, all of the wheel speed sensors on the vehicle may be inaccurately indicating the velocity of the vehicle, as when all of the wheels are spinning (or slipping) simultaneously.

Accordingly, it is desirable to provide a method and system for determining the velocity of a vehicle which selectively utilizes various types of sensors. Other desirable features and characteristics of the present invention will become apparent from the subsequent detailed description and the appended claims, taken in conjunction with the accompanying drawings and the foregoing technical field and background.

SUMMARY OF INVENTION

A method for determining the velocity of a vehicle is provided according to one aspect of the present invention. An initial estimation of the velocity of the vehicle is calculated based on rates of rotation of a plurality of wheels on the vehicles. If any of the wheels on the vehicle are in a brake control, or traction control, situation, the initial estimation is modified based on an acceleration of the vehicle to generate a modified estimation of the velocity of the vehicle.

An automobile is provided according to another aspect of the present invention. The automobile includes a frame, a plurality of wheels coupled to the frame, at least one wheel speed sensor coupled to the frame to detect a rate of rotation for each of the plurality of wheels, an accelerometer coupled to the frame to detect an acceleration of the vehicle, and a processor coupled to the frame and in operable communication with the at least one wheel speed sensor and the accelerometer. The processor is configured to calculate an initial estimation of the velocity of the vehicle based on the rates of rotation of the plurality of wheels detected by the at least one wheel speed sensor and modify the initial estimation based on the acceleration of the vehicle detected by the accelerometer to generate a modified estimation of the velocity of the vehicle if any of the wheels on the vehicle are in a brake control, or traction control, situation.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the schematic diagrams shown herein depict example arrangements of elements, additional intervening elements, devices, features, or components may be present in an actual embodiment.

Figure 1:
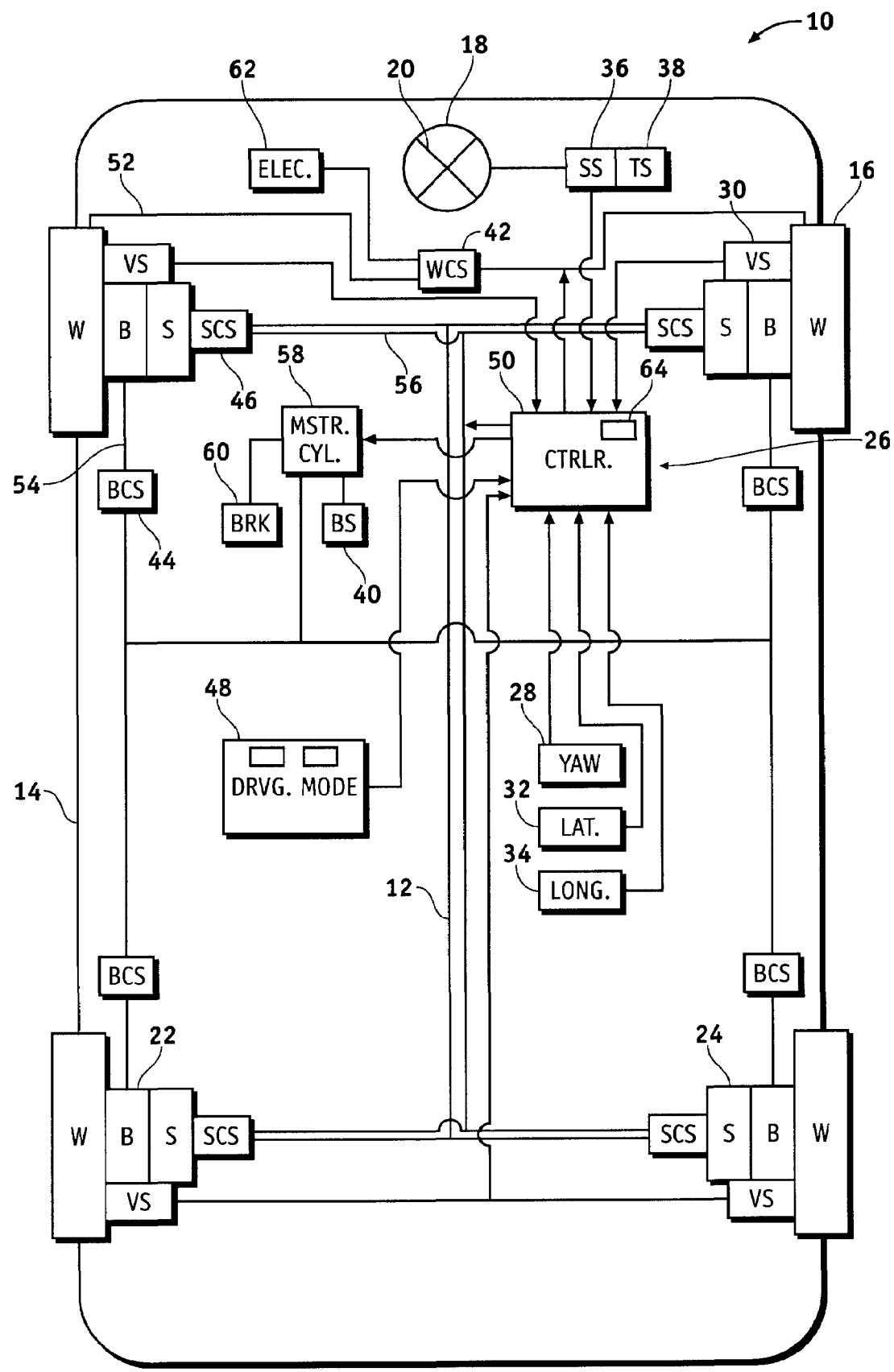
FIG. 1 is a schematic view of an automobile.
Figure 2:
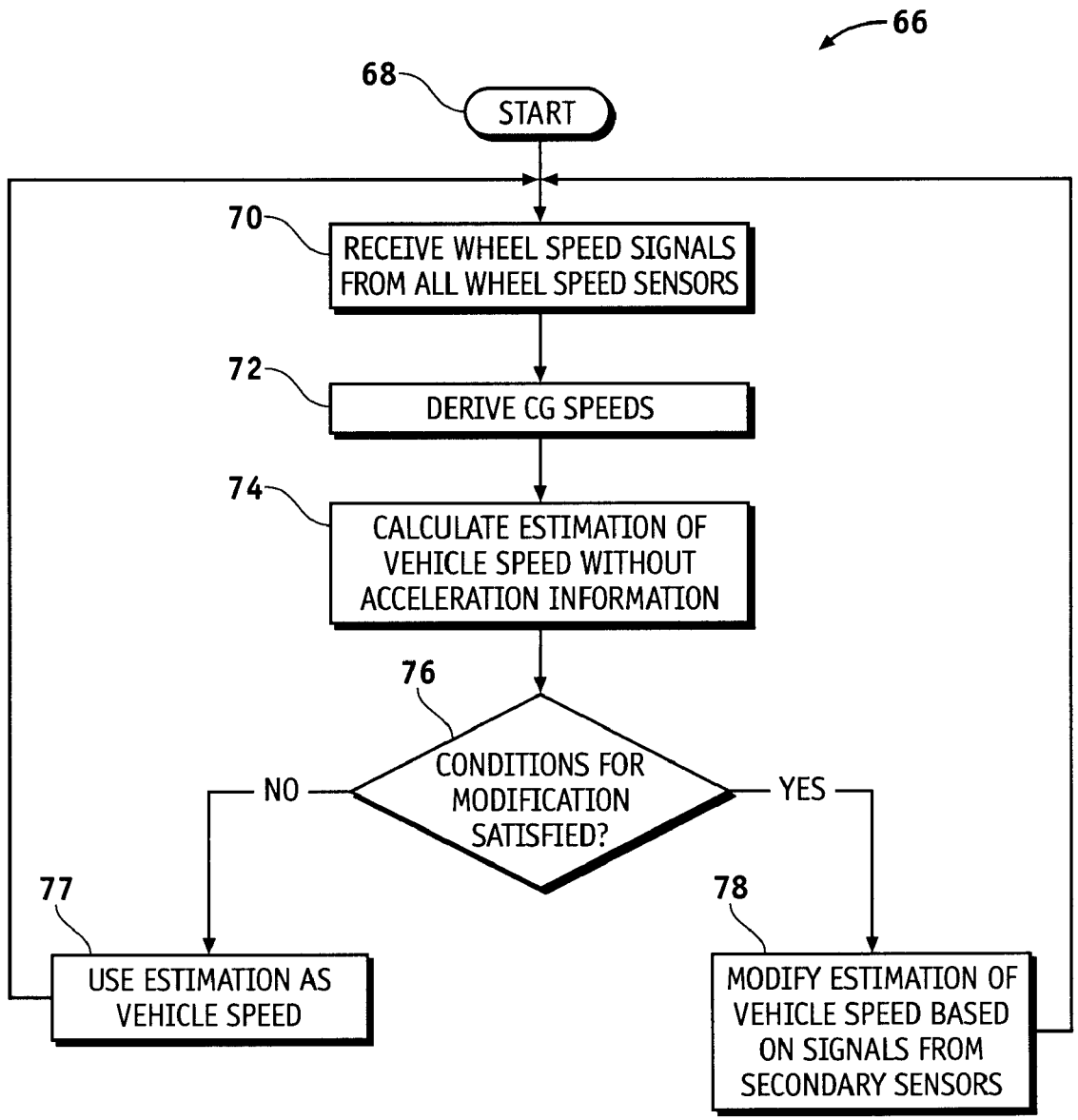
FIG. 2 is a flow chart illustrating a method for determining the velocity of a vehicle according to one embodiment of the present invention.
Figure 3:
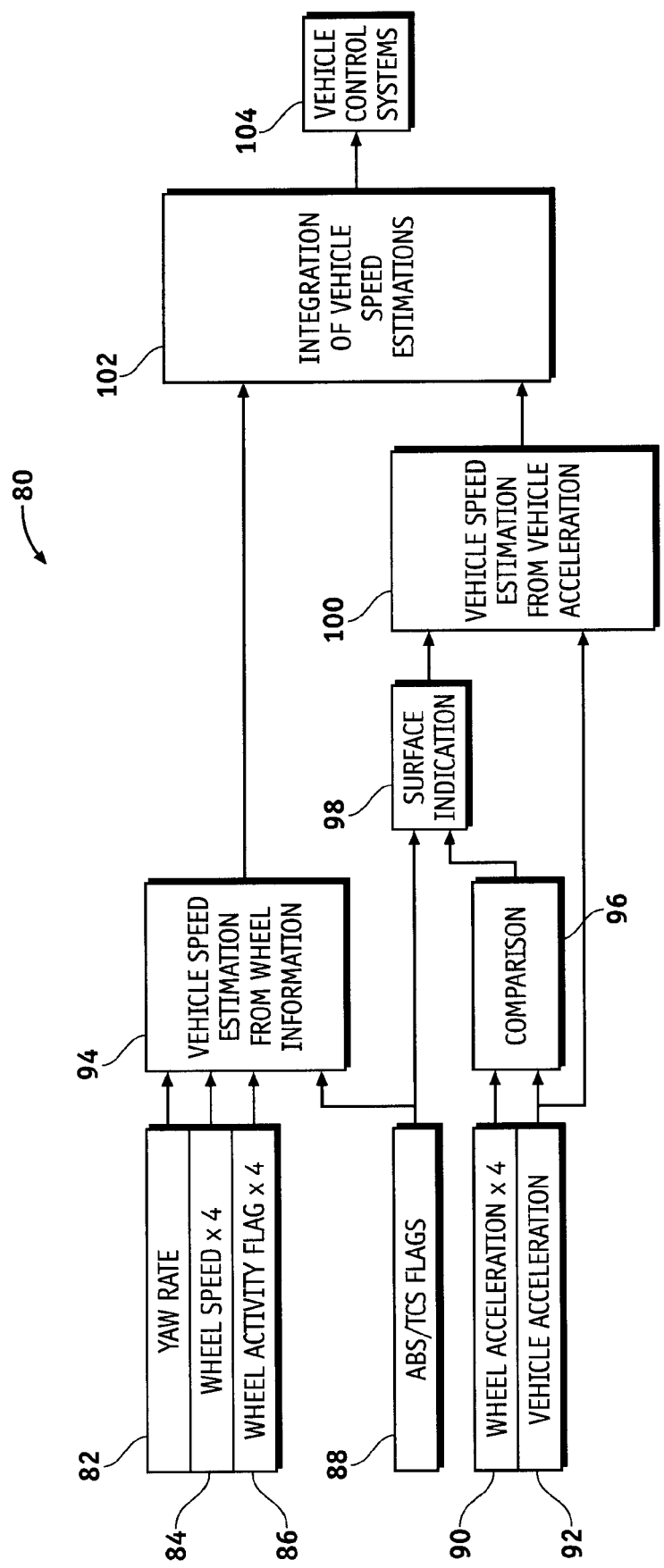
FIG. 3 is a block diagram illustrating the method of FIG. 2, along with a system for determining the velocity of a vehicle, in greater detail.

FIG. 1 to FIG. 3 illustrate a system and method for accurately determining the velocity, or speed, of a vehicle, such as an automobile. An initial estimation of the velocity is calculated based on the rates of rotation for each of the wheels on the automobile, which are detected by wheel speed sensors. This estimation is modified when any of the wheels experience a brake control or traction control situation, such as when the anti-lock braking system (ABS) or the traction control system (TCS) is activated (i.e., any of the wheels slip on the driving surface). The modification is at least partially based on an acceleration of the automobile detected, or calculated, from a sensor on the automobile other than the wheel speed sensors. In this way, when the wheels slip on the driving surface, which detriments the reliability of the wheel speed sensors, an accurate estimation of the velocity of the automobile may be maintained.

It should be noted that for purposes of the following description, the term "brake control situation" may be used generically to describe situations in which ABS, TCS, and/or ESC systems are used, and "brake control actions" may be used generically to describe actions taken performed by ABS, TCS, and/or ESC systems.

FIG. 1 illustrates a vehicle 10, or an automobile, according to one embodiment of the present invention. The automobile 10 includes a chassis 12, a body 14, four wheels ("W") 16, a steering mechanism 18, a steering wheel 20, a braking mechanism 22, a suspension mechanism 24, and an integrated chassis control system (ICCS) 26. The body 14 is arranged on the chassis 12 and substantially encloses the other components of the automobile 10. The body 14 and the chassis 12 may jointly form a frame. The wheels ("W") 16 are rotationally coupled to the chassis 12 near the respective four corners of the body 14. The steering mechanism 18 is mechanically coupled to and arranged for steering the wheels 16 by transferring a driver commanded steering torque on the steering wheel 20 to at least some of the wheels 16 and providing the driver with tactile feedback regarding the steering mechanism 18.

Both the braking mechanism 22 and the suspension mechanism are disposed between the wheels 16 and the chassis 12. The braking mechanism ("B") 22 is arranged for decelerating the wheels 16 upon command, and the suspension mechanism ("S") provides damping vibration at the wheels 16. Steering mechanism 18, braking mechanism 22, and suspension mechanism 24 are alternatively referred to as vehicle subsystems. As shown, the braking mechanism 22 and the suspension mechanism 24 may include multiple individual brakes ("B") and shock/strut assemblies ("S").

The ICCS 26 includes a yaw rate sensor 28 for sensing the actual vehicle yaw rate in degrees-per-second, a wheel velocity (or speed) sensor ("VS") 30 for each of the wheels 16, a lateral acceleration sensor 32, such as an accelerometer, for sensing the absolute value of the lateral acceleration of the vehicle 10, and a longitudinal acceleration sensor 34 (e.g., accelerometer) for sensing the absolute value of the vehicle's longitudinal acceleration. The ICCS 26 also includes a steering angle sensor ("SS") 36 for sensing the angle of steer for the steering wheels, a steering torque sensor ("TS") 38 for sensing the torque in the steering mechanism 18, and a brake pressure sensor ("BS") 40 for sensing the brake fluid pressure.

The ICCS 26 further includes a steering mechanism control system ("WCS") 42, a braking mechanism control system ("BCS"), and a suspension mechanism control system ("SCS") 46. The WCS 42 includes, for example, electronically controlled actuators, electric motors, and dampers for adjusting the stiffness and damping characteristics of, and the degree of steering assist associated with, the steering mechanism 18. The BCS 44 (e.g., electronically controlled actuators, electric motors, and dampers) allows for adjustment of the stiffness and damping characteristics of, and the degree of pressure-apply rate associated with, the braking mechanism 22. The SCS 46 (e.g., electronically controlled actuators, electric motors, and dampers) permits adjustment of the stiffness and damping characteristics of the suspension mechanism 24.

Also within the ICCS 26, a driving mode switch 48 and a central controller 50 are provided. The driving mode switch 48 enables a driver to selectively choose between multiple driving modes, such as, for example, "Normal" and "Sporty" modes, where the "Normal" mode may be for highway cruising and the "Sporty" mode may be for high performance handling. The central controller 50 is arranged in operable communication with sensors 28, 30, 32, 34, 36, 38, and 40, and mechanism control systems 42, 44, and 46.

Control lines 52, 54, and 56, are depicted, for simplicity, as single lines, but represent both signal communication lines and operational links for communicating with and actuating the mechanism control systems 42, 44, and 46, respectively. The BCS 44 is in operable communication with the central controller 50 via a brake master cylinder 58, which in turn is in operable communication with a brake pedal 60. The braking mechanism 22 may be operated by the driver via the brake pedal 60 and the master cylinder 58, or by the controller 200 via the ICCS 26, the master cylinder 58, and brake mechanism control system 44. A vehicle electrical system 62 provides electrical power to all of the vehicle's electrically operated systems, including the controller 50 and the mechanism control systems 42, 44, and 46.

The central controller 50 includes a processor and/or a memory 64 for storing, for example, sensor information and the maximum achievable acceleration and deceleration levels on particular surfaces, such as snow, ice, water, and mud-covered driving surfaces. Further the processor/memory 64 includes instructions stored thereon (or in another computer-readable medium) for carrying out the processes and methods as described below. Additionally, although not specifically shown, it should be understood that the automobile 10, in particular the central controller 50, along with the ICCS 26, may be equipped with an Electronic Stability Control (ESC) system, as well as an anti-lock braking system (ABS) and a traction control system (TCS).

The automobile 10 may be any one of a number of different types of automobiles, such as, for example, a sedan, a wagon, a truck, or a sport utility vehicle (SUV), and in one embodiment is a four-wheel drive (4WD) or an all-wheel drive (AWD) vehicle. However, other embodiments may utilize the method and system described below in two-wheel drive (2WD) vehicles (both rear-wheel drive and front-wheel drive). Although not shown, the vehicle 10 may also incorporate any one of, or combination of, a number of different types of engines, such as, for example, a gasoline or diesel fueled combustion engine, a "flex fuel vehicle" (FFV) engine, a gaseous compound (e.g., hydrogen and natural gas) fueled engine, a combustion/electric motor hybrid engine, and an electric motor. As will be appreciated by one skilled in the art, in an embodiment in which the automobile 10 is 4WD or AWD, the engine is mechanically coupled to all of the wheels. Additionally, as will be appreciated by one skilled in the art, the automobile 10 may include numerous additional components which are not shown in FIG. 1.

FIG. 2 illustrates a method 66 for determining the velocity of an automobile, according to one embodiment of the present invention. The method illustrated may be implemented within the central controller 50, or other components, within the vehicle 10 illustrated in FIG. 1.

Referring again to FIG. 2, the method 66, or process, begins at step 68 with the engine of the automobile 10 being started and the vehicle 10 being driven. As the vehicle moves, the various sensors (such as 28, 30, 32, 34, 36, 38, and 40 shown in FIG. 1) in the vehicle send various signals and types of information indicative of the motion of the vehicle to the central controller 50. As such, at step 70, the central controller 50 receives wheel speed signals from all (e.g., four) of the wheels speed sensors 30 within the vehicle.

At step 72, the central controller 50 derives or calculates, in one embodiment, four center of gravity (CG) speeds (e.g., one for each wheel) for the automobile 10 from the four wheel speed signals, as will be appreciated by one skilled in the art. The calculation of the CG speeds remove any effects caused by vehicle turning which could detriment the calculation of the vehicle speed as described below.

After the CG speeds are calculated, the process continues to step 74 at which point an estimation (or initial estimation) of the vehicle speed is calculated using the CG speeds. This initial estimation does not depend on the longitudinal acceleration signal and is calculated for both normal driving and other conditions when control systems are active. Under normal driving conditions (i.e., when there is no control activity at wheels), the initial estimation is calculated by averaging the CG speeds for the two wheels on the front axle of the vehicle and averaging the CG speeds for the two wheels on the rear axle. The initial estimation is either the smaller or the lager one of the two average speeds depending on either the vehicle is heavily braking or not.

When there are control activities that affect wheel dynamics, such as when any of the wheels is experiencing ABS or TCS actions, the initial estimation of the vehicle speed is calculated by selecting the wheel speeds which most accurately reflect the vehicle speed. For example, if there are wheels without any brake control activity, then the initial estimation is deemed to be the smallest of the CG speeds for those wheels. If all of the wheels are in an ABS situation, the initial estimation is the maximum of the four CG speeds, and if all of the wheels are in a TCS situation, the initial estimation is the minimum of the four CG speeds. Therefore, the initial estimation of vehicle speed is the best estimation possible without vehicle longitudinal acceleration signal.

The process then continues to step 76, where certain conditions are checked to determine if any modifications of the initial estimation are necessary for the first estimation of vehicle speed using additional vehicle acceleration information. Clearly, if neither the ABS nor the TCS flags are on, and as such, none of the wheels are in either an ABS or TCS situation, the process continues to step 77 where the initial estimation of the vehicle speed is determined to be an accurate indication of the vehicle speed. Although not specifically illustrated, it should be understood that the determination of whether which, if any, of the wheels are experiencing ABS or TCS actions may also be made prior to step 74 to facilitate the calculation of the initial estimation of the vehicle velocity. The process then returns to step 70. Those skilled in the art will appreciate that the vehicle acceleration signal may be used only when it is necessary, as it can improve the initial estimation.

If conditions determine that the initial estimation of vehicle speed needs to be modified, such as either the ABS or TCS flag is on (i.e., if any of the wheels are in either an ABS or TCS situation), the process moves on to step 78 at which point the initial estimation of the vehicle velocity is modified or a modified estimation of the vehicle velocity is calculated. The modified calculation of the vehicle velocity further improves the initial estimation by checking on the rate of changes of it with the vehicle acceleration signal, thus removes any "locking" or "spinning" elements in the initial estimation and improve the overall accuracy of the estimation. Those skilled in the art will appreciate the fact that the modification is an integration of information from both wheel speeds and vehicle acceleration. Thus it is free from the shortfalls of mathematically integrating the acceleration to obtaining speed, which is highly affected by noise in the acceleration signal.

FIG. 3 illustrates an example of a system and/or a method 80 in block diagram form for calculating the modified estimation of the vehicle speed. As input signals, the system 80 may include a yaw rate 82, wheels speeds 84, wheel activity flags 86 (i.e., whether each particular wheel is in a brake control situation), ABS and/or TCS flags 88, wheel accelerations 90, and vehicle acceleration 92. The input signals are received or derived from various respective sensors in the automobile 10 illustrated in FIG. 1. As will be appreciated by one skilled in the art, the wheel accelerations 90 may be obtained directly from the wheel speed sensors or calculated by differentiating the wheel speeds.

In block 94, the yaw rate 82, wheel speeds 84, wheel activity flags 86, and the ABS/TCS flags 88 are received to calculate the initial estimation of the vehicle speed from information about the speed of each wheel, as performed at step 74 in FIG. 2.

Referring again to FIG. 3, the wheel accelerations 90 and the vehicle acceleration 92 are received and compared in block 96. The comparison of the wheel accelerations 90 and the vehicle acceleration 96 provides a characterization of how each wheel is behaving relative to the acceleration of the vehicle. For example, high wheel accelerations 94 compared with low vehicle acceleration is indicative of the wheels having a low coefficient of friction ($\mu$) with the driving surface. Thus, the wheels are "spinning," as the vehicle is experiencing a TCS situation, which may also be indicated by the TCS flag. Likewise, high negative wheel accelerations 90 (i.e., decelerations) combined with a smaller vehicle deceleration 92 may indicate a heavy braking or ABS situation, as the wheels may be "locked," as the vehicle is skidding across the driving surface.

The presence of ABS or TCS flags 88 and the comparison 96 of the wheel accelerations 90 and the vehicle acceleration 92 are received in block 98. In block 98, a "surface indication" is generated which provides an indication of the current coefficient of friction between the driving surface and the wheels, or more particularly, the tires on the wheels. As will be appreciated by one skilled in the art, a high coefficient of friction indicates good traction between the tires and the driving surface (e.g., dry pavement), and a low coefficient of friction indicates relatively poor traction between the tires and the driving surface (e.g., snow or ice).

The surface indication 98 and the vehicle acceleration 92 are received in block 100, where an estimation of the vehicle speed is calculated via information about the acceleration of the vehicle. As is commonly understood, this calculation may be an integration of the vehicle acceleration 92 with respect to time. As will also be appreciated by one skilled in the art, the vehicle acceleration 92 may be processed before being used in this calculation. The processing of the vehicle acceleration 92 may involve the removal of electrical offset and gravitational factors (or gravity factor) commonly found in sensor signals. For example, the vehicle acceleration signal 92 may be compared with the wheel accelerations 90, which do not account for gravitational effects. In particular situations, the electrical offset and the gravity factor may be calculated by filtering the difference between vehicle and wheel acceleration signals. A vehicle acceleration signal, free from offsets and gravitational factors, may then be calculated by subtracting the offset and gravity factor from the sensor signal 92.

In block 102, the vehicle speed estimation from wheel information 94 and the vehicle speed information from vehicle acceleration 100 are combined, or integrated, to calculate the modified estimation of the vehicle speed. Generally, the modified estimation may combine the signals from the wheel speed sensors 30 and the acceleration sensors 32 and 34, as shown in FIG. 1. Referring again to FIG. 3, the calculation of the modified estimation may include posing limits on the gradient of the vehicle speed estimation from wheel information 94. The limits on the gradient essentially remove any effects caused by either the wheels spinning or locking up during vehicle speed calculations. The gradient limits may be calculated using the surface indication 98 along with pre-stored maximum achievable acceleration and deceleration levels on particular surfaces, such as snow, ice, water, and mud-covered driving surfaces. The modified estimation of the vehicle speed is then sent to the vehicle control systems 104, which utilize the modified estimation in applying appropriate ESC, ABS, and TCS actions.

While there are numerous advantages provided by the method and system described above that are not expressly or implicitly described herein, one advantage is that because it selectively incorporates the sensors on the vehicle, it maximizes the usefulness of the sensors while improving the accuracy with which the vehicle speed is calculated. Therefore, even when some of the wheels on the automobile are slipping on the driving surface, an accurate estimation of the velocity of the vehicle may be maintained. As a result, the efficiency of electrical systems which improve the handling of automobiles, such as ESC, is improved. It should be noted that the method and system described above may be utilized in all automobiles, but may be particularly useful in four-wheel drive (4WD) or all-wheel drive (AWD) vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining a velocity of a vehicle comprising:
    calculating an initial estimation of the velocity of the vehicle based on rates of rotation of a plurality of wheels on the vehicle, wherein the rates of rotation of the plurality of wheels are detected by wheel speed sensors and the acceleration of the vehicle is at least partially determined by an accelerometer;
    modifying the initial estimation based on an acceleration of the vehicle to generate a modified estimation of the velocity of the vehicle if any of the wheels on the vehicle are in a brake control situation, wherein said modification of the initial estimation comprises:
        calculating a rotational acceleration for each wheel on the vehicle;
        comparing the acceleration of the vehicle to the rotational acceleration for each wheel on the vehicle, said comparison being indicative of a coefficient of friction between each of the wheels on the vehicle and a driving surface on which the vehicle is traveling; and
        limiting the gradient of the initial estimation based on the acceleration of the vehicle and said comparison of the detected acceleration of the vehicle and the rotational acceleration for each wheel; and
    continuously repeating said calculation of the initial estimation and said modification of the initial estimation.

2. The method of claim 1, wherein the brake control situation comprises at least one of an anti-lock braking (ABS) action and a traction control system (TCS) action.

3. The method of claim 2, where the vehicle is at least one of a four-wheel drive (4WD) and an all-wheel drive (AWD) vehicle.

4. A method for determining a velocity of an automobile comprising:
    detecting a rate of rotation for each of a plurality of wheels on the automobile with a plurality of wheels speed sensors on the automobile;
    calculating an initial estimation of the velocity of the automobile based on the detected rates of rotation for the plurality of wheels;
    calculating a rotational acceleration for each wheel on the automobile;
    detecting an acceleration of the automobile with an accelerometer on the automobile;
    comparing the rotational acceleration for each wheel on the automobile with the acceleration of the automobile detected by the accelerometer; and
    modifying the initial estimation of the velocity of the automobile based on said comparison of the rotational acceleration for each wheel with the acceleration detected by the accelerometer to generate a modified estimation of the velocity of the automobile if any of the wheels on the automobile are experiencing at least one of anti-lock braking (ABS) and traction control system (TCS) activity.

5. An automobile comprising:
    a frame;
    a plurality of wheels coupled to the frame;
    at least one wheel speed sensor coupled to the frame to detect a rate of rotation for each of the plurality of wheels;
    an accelerometer coupled to the frame to detect an acceleration of the vehicle; and
    a processor coupled to the frame and in operable communication with the at least one wheel speed sensor and the accelerometer, the processor being configured to:
        calculate an initial estimation of the velocity of the vehicle based on the rates of rotation of the plurality of wheels detected by the at least one wheel speed sensor;
        modify the initial estimation based on the acceleration of the vehicle detected by the accelerometer to generate a modified estimation of the velocity of the vehicle if any of the wheels on the vehicle are in a brake control situation, wherein said modification of the initial estimation comprises:
            calculating a rotational acceleration for each wheel on the vehicle; and
            comparing the acceleration of the vehicle to the rotational acceleration for each wheel on the vehicle, said comparison being indicative of coefficient of friction between each of the wheels on the vehicle and a driving surface on which the vehicle is traveling; and
            limiting the gradient of the initial estimation based on the detected acceleration of the vehicle and said comparison of the detected acceleration of the vehicle and the rotational acceleration for each wheel; and continuously repeat said calculation of the initial estimation and modification the initial estimation.

6. The automobile of claim 5, wherein the brake control situation comprises at least one of an anti-lock braking (ABS) action and a traction control system (TCS) action.

7. The automobile of claim 6, wherein each of the plurality of wheels is mechanically coupled to an engine connected to the frame.

8. The automobile of claim 7, further comprising a memory in operable communication with the frame, the memory having a plurality of maximum achievable accelerations for a plurality of driving surfaces stored thereon.

* * * * *